United States Patent
Pelger

(10) Patent No.: US 10,731,796 B2
(45) Date of Patent: Aug. 4, 2020

(54) ASCERTAINING THE STARTING CAPABILITY OF A VEHICLE

(71) Applicant: Bayerische Motoren Werke Aktiengesellschaft, Munich (DE)

(72) Inventor: Andreas Pelger, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/298,732

(22) Filed: Mar. 11, 2019

(65) Prior Publication Data

US 2019/0203886 A1 Jul. 4, 2019

Related U.S. Application Data

(63) Continuation of application No. PCT/EP2017/071137, filed on Aug. 22, 2017.

(30) Foreign Application Priority Data

Sep. 12, 2016 (DE) .......................... 10 2016 217 341

(51) Int. Cl.
*B60Q 1/00* (2006.01)
*F17C 13/02* (2006.01)

(52) U.S. Cl.
CPC .......... *F17C 13/025* (2013.01); *F17C 13/026* (2013.01); *F17C 2221/012* (2013.01);
(Continued)

(58) Field of Classification Search
CPC ............ F17C 2223/033; F17C 2223/03; F17C 2223/038; F17C 2227/0379;
(Continued)

(56) References Cited

U.S. PATENT DOCUMENTS 2,127,536 A * 8/1938 Schlumbohm ......... B65D 90/44
                                                        44/457
2,492,777 A * 12/1949 Wirth .................... B64D 13/08
                                                        126/116 R
(Continued)

FOREIGN PATENT DOCUMENTS

CN          101545577 A        9/2009
CN          102235269 A        11/2011
(Continued)

OTHER PUBLICATIONS

PCT/EP2017/071137, International Search Report dated Nov. 27, 2017 (Two (2) pages).
(Continued)

*Primary Examiner* — Hai Phan
*Assistant Examiner* — Son M Tang
(74) *Attorney, Agent, or Firm* — Crowell & Moring LLP

(57) ABSTRACT

A method for ascertaining the re-starting capability of a vehicle, in particular when parking the vehicle, includes detecting the pressure and the temperature of fuel in a pressurized container, determining a final pressure value of the fuel in the pressurized container, where the final pressure value is an expected pressure of the fuel in the pressurized container after a period of parking of the vehicle, comparing the final pressure value with a minimum pressure value in order to ascertain whether the vehicle is capable of re-starting after the parking period, and generating a warning signal when the final pressure value is lower than the minimum pressure value.

17 Claims, 1 Drawing Sheet

(52) U.S. Cl.
CPC ............... F17C 2221/033 (2013.01); F17C 2223/0123 (2013.01); F17C 2223/0161 (2013.01); F17C 2223/033 (2013.01); F17C 2223/036 (2013.01); F17C 2227/0302 (2013.01); F17C 2227/0369 (2013.01); F17C 2250/032 (2013.01); F17C 2250/036 (2013.01); F17C 2250/043 (2013.01); F17C 2250/0426 (2013.01); F17C 2250/0439 (2013.01); F17C 2250/0495 (2013.01); F17C 2250/0694 (2013.01); F17C 2250/072 (2013.01); F17C 2265/066 (2013.01); F17C 2270/0178 (2013.01); F17C 2270/0184 (2013.01); Y02E 60/321 (2013.01)

(58) Field of Classification Search
CPC ........ F17C 2227/0383; F17C 2250/043; F17C 2250/0439; F17C 2265/036; F17C 2265/037; F17C 2250/0626; F17C 2250/0631
See application file for complete search history.

(56) References Cited

U.S. PATENT DOCUMENTS

| | | | | |
|---|---|---|---|---|
| 3,509,529 | A * | 4/1970 | Utter | B60R 16/0232 340/461 |
| 4,053,868 | A * | 10/1977 | Cox | B60Q 11/00 340/461 |
| 4,494,116 | A * | 1/1985 | Tagami | G01C 21/26 340/988 |
| 4,520,764 | A * | 6/1985 | Ozawa | F02B 1/02 123/179.14 |
| 6,293,261 | B1 * | 9/2001 | Oemcke | F02M 25/0854 123/516 |
| 6,382,191 | B1 * | 5/2002 | Curran | F02D 41/004 123/518 |
| 8,073,636 | B2 * | 12/2011 | Bauer | F02D 41/0027 702/22 |
| 9,222,699 | B1 * | 12/2015 | Hendrickson | F02M 31/125 |
| 9,879,641 | B2 * | 1/2018 | Ham | F02D 41/22 |
| 2003/0116490 | A1 * | 6/2003 | Keyster | B01D 35/18 210/184 |
| 2006/0023480 | A1 * | 2/2006 | Plummer | B60H 1/00278 363/146 |
| 2006/0048752 | A1 * | 3/2006 | Stroia | F02M 25/0809 123/458 |
| 2006/0208169 | A1 * | 9/2006 | Breed | B60N 2/002 250/221 |
| 2007/0298313 | A1 * | 12/2007 | Iida | B60L 1/003 429/49 |
| 2008/0119966 | A1 * | 5/2008 | Breed | G07C 5/008 701/2 |
| 2009/0088983 | A1 * | 4/2009 | Bauer | F02D 41/0027 702/24 |
| 2011/0000463 | A1 * | 1/2011 | Kokotovic | F02D 41/042 123/457 |
| 2011/0308302 | A1 * | 12/2011 | Makino | F02M 25/0836 73/40.7 |
| 2012/0152213 | A1 * | 6/2012 | Watanabe | F02M 31/042 123/556 |
| 2013/0052557 | A1 * | 2/2013 | Okawachi | F17C 1/06 429/444 |
| 2014/0074385 | A1 * | 3/2014 | Dudar | F02M 25/0818 701/113 |
| 2015/0046026 | A1 * | 2/2015 | Pearce | G07C 5/00 701/33.9 |
| 2015/0059890 | A1 * | 3/2015 | Iwaya | F02M 25/0809 137/557 |
| 2015/0217751 | A1 * | 8/2015 | Reed | B60W 10/02 701/67 |
| 2017/0089304 | A1 * | 3/2017 | Dudar | F02M 65/003 |
| 2017/0370266 | A1 * | 12/2017 | Togawa | F01N 3/05 |
| 2018/0195445 | A1 * | 7/2018 | Iriyama | F02D 41/004 |

FOREIGN PATENT DOCUMENTS

| | | |
|---|---|---|
| CN | 103818562 A | 5/2014 |
| DE | 10 2007 002 752 A1 | 11/2007 |
| DE | 10 2013 204 633 A1 | 9/2013 |
| DE | 10 2012 216 778 A1 | 5/2014 |
| DE | 10 2014 219 716 A1 | 3/2016 |
| EP | 1 546 601 B1 | 6/2005 |
| WO | WO 2014/200959 A2 | 12/2014 |
| WO | WO 2015/193020 A1 | 12/2015 |

OTHER PUBLICATIONS

German Search Report issued in German counterpart application No. 10 2016 217 341.3 dated Aug. 8, 2017, with Statement of Relevancy (Eight (8) pages).
Chinese Office Action issued in Chinese application No. 201780055800.5 dated May 7, 2020, with English translation (Fifteen (15) pages).

* cited by examiner

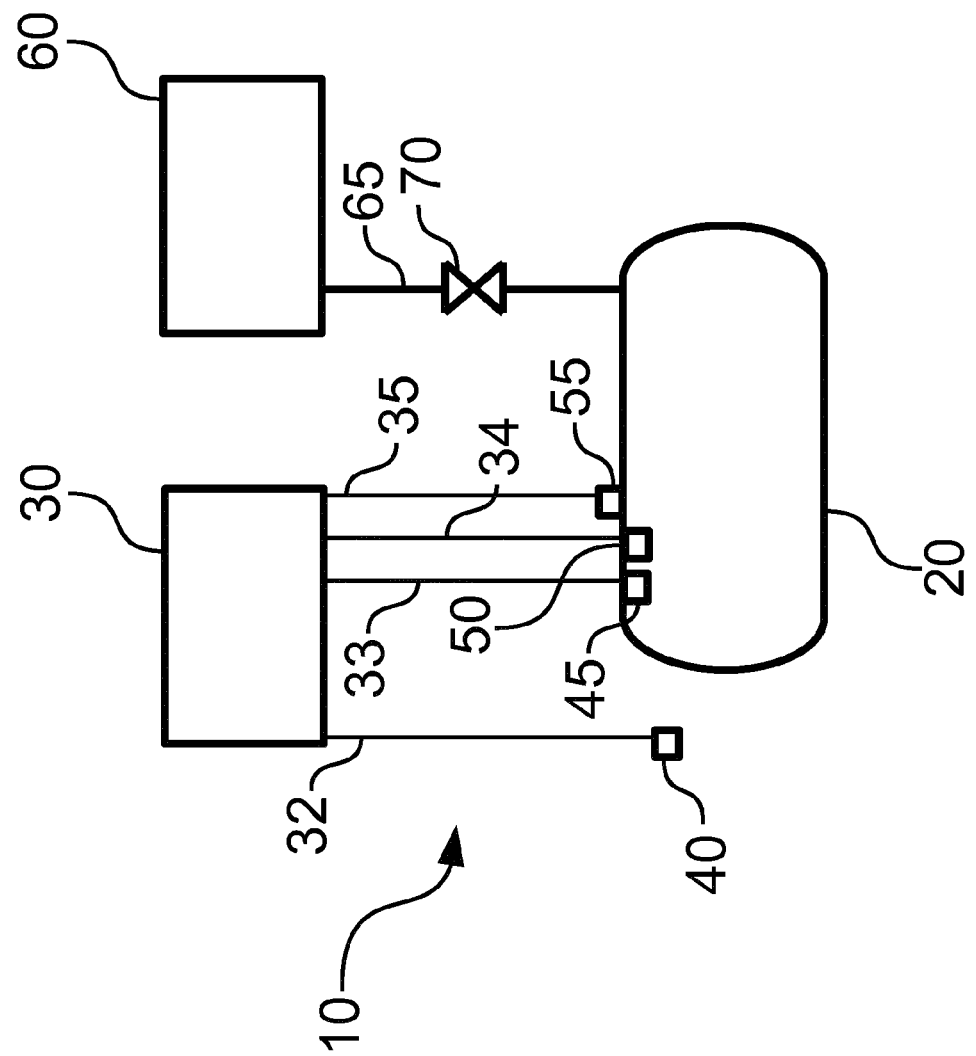

ASCERTAINING THE STARTING CAPABILITY OF A VEHICLE

CROSS REFERENCE TO RELATED APPLICATIONS

This application is a continuation of PCT International Application No. PCT/EP2017/071137, filed Aug. 22, 2017, which claims priority under 35 U.S.C. § 119 from German Patent Application No. 10 2016 217 341.3, filed Sep. 12, 2016, the entire disclosures of which are herein expressly incorporated by reference.

BACKGROUND AND SUMMARY OF THE INVENTION

The invention relates to a method for ascertaining the restarting capability of a vehicle when parking the vehicle, and to a pressure vessel system for a vehicle.

In pressure vessel systems for $CGH_2$ and CNG in vehicles known to date, the pressure of the fuel in the pressure vessel drops due to the extraction of hydrogen. At a certain limit pressure, for example 20 bar, further extraction is usually no longer possible or no longer permissible in order to prevent deformation or buckling of the pressure vessel owing to a further drop in pressure due to further extraction of fuel. In addition, the fuel typically has to have a minimum pressure, so that the fuel passes from the pressure vessel to the fuel consuming apparatus by means of which the vehicle is driven.

The operation of the vehicle may result in cooling down of the fuel due to extraction (expansion chill) in specific situations, for example high installation space temperature (the installation space temperature is the temperature which prevails in the installation space of the pressure vessel) and low extraction rate, on account of the installation space temperature (exhaust gas system and waste heat from the fuel consuming apparatus) being compensated and, as a result, the fuel in the pressure vessel being at a temperature which is equal to or greater than the ambient temperature when parking the vehicle or during planned restarting of the vehicle (the ambient temperature is the outside temperature). This state can theoretically occur in winter when the pressure vessel or the tank is heated by the vehicle waste heat during the extraction phase and cools down when parked overnight.

Therefore, in the case of pressure vessel systems known to date, the situation can occur under unfavorable circumstances (for example due to very large day/night temperature differences, extreme weather fluctuations) of there being a sufficiently high pressure (greater than the minimum pressure value) of the fuel in the pressure vessel before parking the vehicle and turning off the vehicle, but the pressure of the fuel dropping below the minimum pressure value as a result of cooling down due to the surroundings while the vehicle is parked and, respectively, switched off, as a result of which the vehicle can no longer be started.

Consequently, under unfavorable circumstances, it can occur that the pressure of the fuel lies above the minimum pressure value or a minimum pressure before the vehicle is parked but the vehicle no longer has the capability to start after parking since the pressure of the fuel in the pressure vessel is too low even though there is a sufficient quantity of fuel in the pressure vessel for driving the vehicle. This statement applies only when the temperature of the medium rises (due to rising ambient temperature).

High-pressure gas vessel systems (also called "$CGH_2$ systems") are designed to permanently store fuel at a pressure of over approximately 350 bar overpressure (=overpressure in comparison to atmospheric pressure), further preferably of over approximately 500 bar overpressure and particularly preferably of over approximately 700 bar overpressure, at ambient temperatures.

Cryogenic pressure vessel systems (also called "$CcH_2$ systems") are known from the prior art. By way of example, EP 1 546 601 B1 discloses a system of this kind.

It is a preferred object of the technology disclosed here to reduce or to eliminate at least some disadvantages of the previously known solutions. Further preferred objects can be found in the advantageous effects of the technology disclosed here.

In particular, the object is achieved by a method for ascertaining the restarting capability of a vehicle, in particular when parking the vehicle, wherein the vehicle has a pressure vessel system comprising a pressure vessel for storing a fuel, the method comprising the following steps: detecting the pressure and the temperature of the fuel in the pressure vessel, determining a final pressure value of the fuel in the pressure vessel, wherein the final pressure value is the expected pressure of the fuel in the pressure vessel after a parking period of the vehicle, comparing the determined final pressure value with a minimum pressure value for ascertaining whether the vehicle is capable of restarting after the parking period, and generating a notification signal when the determined final pressure value is lower than the minimum pressure value.

One advantage of this is that it is ascertained whether the vehicle can be restarted before parking the vehicle, in particular when parking the vehicle. As a result, possible breakdown of the vehicle after parking is prevented. The expected pressure of the fuel in the pressure vessel is, in particular, the calculated or estimated pressure of the fuel in the pressure vessel. The calculation or estimation can take place, in particular, on the basis of the respectively current known values.

The parking period or the period for which the vehicle is turned off can be entered by the user or driver or can be a calculated parking period based on experience or historical data. It is possible to estimate or determine, on the basis of the time of day and the location (for example 23:00 hours, at the home address of the driver), how long the parking period is likely to be (for example approximately 8 hours until the driver drives from the home address to his/her place of work the next morning).

The term "during parking" can include the time period shortly before the vehicle is actually parked (for example when entering a parking spot or when driving into a parking garage or underground parking garage). Ascertaining whether parking is immediately imminent or currently taking place can be carried out on the basis of position data, historical data and/or by a parking button which the driver operates. The term "before parking" also includes the time during driving of the vehicle. Therefore, the minimum pressure value can be determined again at intervals or continuously during driving or operation of the vehicle.

The vehicle is no longer capable of starting when the pressure of the fuel at the end of the parking period is below the minimum pressure value since the supply pressure for the fuel cell is too low or further extraction of fuel from the pressure vessel can lead to damage to the pressure vessel.

The ambient temperature can be taken into account when determining the final pressure value. By taking into account the ambient temperature or outside temperature, it is possible to predict more precisely whether the vehicle can be restarted after parking. Consequently, even smaller quantities of fuel may be sufficient for restarting the vehicle after parking.

The expected temperature development of the ambient temperature during the parking period, in particular on the basis of weather forecast data, can be taken into account when determining the final pressure value. As a result, it is possible to predict more reliably whether the vehicle can be restarted after parking. Therefore, even smaller quantities of fuel may be sufficient for restarting the vehicle after parking, e.g., because the fuel cell in park mode has converted H2. It is important that the medium temperature in this case is higher than when parking.

A notification to the driver of the vehicle, in particular a warning notification to the driver of the vehicle that the vehicle should not be parked but rather the pressure vessel of the vehicle should be filled before parking, is given on the basis of the notification signal. As a result, the driver of the vehicle can take measures in order to ensure a restarting capability of the vehicle after parking. In particular, the driver can fill the pressure vessel system with fuel before parking, so that restarting of the vehicle after parking will be possible. It is also conceivable for the driver to park the vehicle in a parking garage or in a manner protected against cold, so that the temperature of the fuel and consequently the pressure of the fuel does not drop so severely.

In response to the notification signal being generated, the fuel in the pressure vessel can be heated and the final pressure value can be determined again until the final pressure value has reached or undershot the minimum pressure value if it is possible to reach the minimum pressure value without exceeding a maximum temperature of the fuel in the pressure vessel and without exceeding a maximum pressure of the pressure vessel solely by heating. One advantage of this is that it is actively ensured that, when restarting of the vehicle after the parking period or after parking is actually possible on the basis of the existing quantity of fuel or density of fuel, adequate pressure conditions for restarting the vehicle are generated before parking, in particular when parking the vehicle. This prevents breakdown of the vehicle.

The minimum pressure value can be determined depending on the range of the vehicle which is required until the next filling station for filling the pressure vessel. The minimum pressure value is therefore determined (at a high level) in such a way that there is a sufficiently high pressure in the pressure vessel even while fuel is being consumed on the way to the next filling station (after parking and restarting of the vehicle). "Sufficiently high" means, in particular, that (even while driving directly to the nearest filling station after parking) neither is the supply pressure for the fuel cell, or will the supply pressure for the fuel cell become, too low nor can further extraction of fuel from the pressure vessel lead to damage to the pressure vessel. The minimum pressure value which is determined in this way is therefore higher than the minimum pressure value which is determined when the range which is required until the next filling station is not taken into consideration but rather the focus is only on restarting the vehicle after parking. One advantage of this is that not only is it ensured that the vehicle is capable of restarting after parking but a check is also made as to whether the vehicle has a sufficiently high pressure to move the vehicle to the next filling installation or filling station after restarting the vehicle after parking. Consequently, a check is made as to whether it (is expected that it) will be possible to drive to the next filling station after parking. The minimum pressure value can be determined again during driving (and therefore before parking the vehicle) at intervals or continuously. In this case, the starting point can be, for example, a parking period which is of such a length that the temperature of the fuel has reached the temperature of the surroundings (in particular the ambient temperature after the parking period) (thermodynamic equalization). As an alternative, the parking period can be estimated, for example, with reference to historical data. During driving of the vehicle, a warning can be issued to the driver on the basis of the notification signal or in response to the notification signal when he is so far away from the next filling station for filling the pressure vessel with fuel, or shortly before this time, to do so that, when the temperature of the fuel is matched to the ambient temperature (either the current ambient temperature or the expected ambient temperature at a later time, wherein this is determined, for example, with reference to weather forecast data), the pressure of the fuel in the pressure vessel lies below the minimum pressure value (wherein, when determining the minimum pressure value, driving to the next filling station after restarting the vehicle after parking is taken into account). This means that a check is made during driving as to whether the vehicle is capable of restarting, that is to say there is a sufficiently high pressure of the fuel after the parking period to move the vehicle, and the vehicle can be driven to the next filling station after restarting without falling below a minimum pressure in the pressure vessel in the event of the vehicle being immediately parked and a parking period (which is so long that complete equalization of the fuel temperature and the ambient temperature has taken place or the duration of which parking period is estimated on the basis of historical data). The minimum pressure is determined in that, below the minimum pressure, the supply pressure for the fuel cell is too low or further extraction of fuel from the pressure vessel can lead to damage to the pressure vessel. The driver can be warned by way of an acoustic and/or optical and/or haptic warning (for example "If you park the vehicle now, it is likely that you will no longer be able to reach a filling station after restarting the vehicle after parking!") if he/she is too far away from the filling station.

The temperature of the pressure vessel can be taken into account when determining the final pressure value. One advantage of this is that predicting the capability to restart can be carried out more precisely.

Determining the final pressure value of the fuel in the pressure vessel can be carried out on the basis of a characteristic map. As a result, it is possible to ascertain whether the vehicle is capable of restarting after parking with a low level of computational expenditure.

The fuel in the pressure vessel can be heated when the pressure of the fuel in the pressure vessel lies below the minimum pressure value when restarting the vehicle after parking. If the duration of parking was (considerably) longer than the (determined) parking period, the result may be, under unfavorable circumstances in spite of ascertaining or predicting that the vehicle can be restarted, that the pressure of the fuel has dropped below the minimum pressure value. In this case, the fuel can consequently be heated in order to reach a pressure of the fuel which corresponds at least to the minimum pressure value. It is conceivable for the fuel consuming apparatus (for example a fuel cell) to be operated when the tank shut-off valve is blocked by way of fuel being supplied to the fuel consuming apparatus from a buffer store downstream behind the tank shut-off valve. The waste heat from the fuel consuming apparatus can be used to heat the fuel in the pressure vessel. It is also conceivable for a heat exchanger to be supplied with energy by the fuel consuming apparatus and for the heat exchanger to be designed to heat the fuel in the pressure vessel. The energy for heating the fuel in the pressure vessel can come from a high-voltage store.

In particular, the object is also achieved by a pressure vessel system for a vehicle, wherein the pressure vessel system comprises at least one pressure vessel for storing a fuel, a temperature measuring apparatus for measuring the temperature of the fuel in the pressure vessel, a pressure measuring apparatus for measuring the pressure of the fuel in the pressure vessel, and a control device, wherein the control device is designed to determine a final pressure value, in particular when parking the vehicle, wherein the final final pressure value is the expected pressure of the fuel in the pressure vessel after a parking period of the vehicle, and to compare the determined final pressure value with a minimum pressure value for ascertaining whether the vehicle is capable of restarting after the parking period, wherein the control device is further designed to generate a notification signal, in particular when parking the vehicle, when the determined final pressure value lies below the minimum pressure value.

One advantage of this is that it is possible to ascertain whether the vehicle can be restarted as early as before parking of the vehicle, in particular when parking the vehicle. As a result, possible breakdown of the vehicle after parking is prevented.

The pressure vessel system can further comprise a heating apparatus, in particular a heat exchanger, for heating the fuel in the pressure vessel in response to the notification signal being generated if it is possible to reach the minimum pressure value without exceeding a maximum temperature of the fuel in the pressure vessel and without exceeding a maximum pressure of the pressure vessel solely by heating, and the control device is designed to determine the final pressure value again until the final pressure value has reached or exceeded the minimum pressure value. One advantage of this is that it is actively ensured that, when restarting of the vehicle after the parking period or after parking is actually possible on the basis of the existing quantity of fuel or density of fuel, adequate pressure conditions for restarting the vehicle are generated before parking, in particular when parking the vehicle. This prevents breakdown of the vehicle.

The pressure vessel system can further comprise a fuel consuming apparatus which is designed to drive the vehicle and is designed and arranged such that it can be supplied with fuel from the pressure vessel via a fluid line, wherein the pressure vessel system further comprises a buffer store for buffer-storing fuel from the pressure vessel and supplying the fuel consuming apparatus with fuel when the fluid line is blocked. As a result, the fuel consuming apparatus (for example a fuel cell) can be operated when the tank shut-off valve is blocked, that is to say when the fluid line from the pressure vessel is closed. The waste heat from the fuel consuming apparatus can be used to heat the fuel in the pressure vessel. It is also conceivable for a heat exchanger to be supplied with energy by the fuel consuming apparatus and for the heat exchanger to be designed to heat the fuel in the pressure vessel. The energy for heating the fuel in the pressure vessel can come from a high-voltage store.

It is also conceivable for the pressure and the temperature at the time of planned parking of the vehicle to be calculated or determined from the measured pressure and the measured temperature and for these values to be used for determining the final pressure value.

The fuel can be a fuel which is in gaseous form (at standard pressure of 1000 bar and standard temperature of 0° C.), in particular hydrogen. The fuel (for example CNG or H2) can be supplied to a fuel consuming apparatus which is designed to drive the vehicle.

The technology disclosed here relates, inter alia, to a pressure vessel system (compressed hydrogen storage system (=CHS system)) for storing fuel which is in gaseous form under ambient conditions. A pressure vessel of this kind is, in particular, a pressure vessel which is installed or can be installed in a motor vehicle. The pressure vessel can be used in a motor vehicle which is operated, for example, using compressed natural gas (=CNG) or liquefied natural gas (LNG) or using hydrogen. The pressure vessel can be, for example, a cryogenic pressure vessel (=CcH2) or a high-pressure gas vessel (=CGH2). High-pressure gas vessels are designed to permanently store fuel at a maximum operating pressure (also called MOP) of over approximately 350 bar overpressure (=overpressure in comparison to the atmospheric pressure), further preferably of over approximately 500 bar overpressure and particularly preferably of over approximately 700 bar overpressure, essentially at ambient temperatures. A cryogenic pressure vessel is particularly suitable for storing the fuel at temperatures which lie considerably below the operating temperature (meaning the temperature range of the area surrounding the vehicle in which the vehicle is intended to be operated) of the motor vehicle, for example at least 50 Kelvins, preferably at least 100 Kelvins or at least 150 Kelvins below the operating temperature of the motor vehicle (generally approximately −40° C. to approximately +85° C.).

The technology disclosed here will now be explained with reference to the FIGURE.

Other objects, advantages and novel features of the present invention will become apparent from the following detailed description of one or more preferred embodiments when considered in conjunction with the accompanying drawing.

BRIEF DESCRIPTION OF THE DRAWING

The FIGURE shows a schematic view of the pressure vessel system of the present invention.

DETAILED DESCRIPTION OF THE DRAWING

The FIGURE shows a schematic view of the pressure vessel system 10 disclosed here. The pressure vessel system 10 comprises a pressure vessel 20, a fuel consuming apparatus 60 and a control device 30. The pressure vessel 20 serves to store fuel, in particular hydrogen. The fuel can be CcH2, CGH$_2$ or CNG.

The pressure vessel system 10 is arranged in a vehicle. The pressure vessel 20 is connected to the fuel consuming apparatus 60 via a fluid line 65 and a tank shut-off valve 70 in the fluid line 65. The fuel consuming apparatus 60 serves to drive the vehicle. The fuel consuming apparatus 60 can be a fuel cell.

The control device 30 is connected via measuring lines 32, 33, 34, 35 to a first temperature measuring apparatus 45 for measuring the temperature of the fuel in the pressure vessel 20, to a pressure measuring apparatus 50 for measuring the pressure of the fuel in the pressure vessel 20, to a second temperature measuring apparatus 55 for measuring the temperature of the pressure vessel 20 and/or the installation space temperature (the installation space temperature is the temperature which prevails in the installation space of the pressure vessel 20) and to an ambient temperature measuring apparatus 40 for measuring the ambient temperature or the outside temperature.

When parking the vehicle, that is to say when the control device 30 identifies that a parking process is being carried out or is immediately imminent, it is ascertained whether the vehicle is capable of restarting after a parking period, that is to say whether a sufficiently high pressure of the fuel (corresponding at least to the minimum pressure value) will be present, so that further extraction of fuel can be carried out without possible damage to the pressure vessel 20.

The parking period (for example 30 minutes, 1 hour or 8 hours) can be entered by the user or can be a parking duration which is calculated based on experience or historical data or comprise other customer data (appointment planning, navigation data, ConnectedDrive or similar systems from other manufacturers).

Ascertaining whether parking (and therefore turning off of the vehicle and consequently stoppage of fuel extraction) is immediately imminent or is currently taking place (for example entering a parking spot and/or driving into a parking garage) can be carried out on the basis of navigation data, position data, historical data and/or by a parking button which the driver operates.

It is also conceivable that the starting point is a parking period which is so long that (thermodynamic) equalization between the temperature of the fuel and the ambient temperature has taken place, that is to say the fuel is at the temperature of the surrounding area (which is determined by means of weather forecast services or, when parking in parking garages, by means of the ambient temperature of the parking garage) at the end of the parking period.

The control device 30 detects the temperature and the pressure of the fuel in the pressure vessel 20. The temperature of the pressure vessel 20 and the ambient temperature are likewise detected. In addition, weather forecast data (for example from the Internet or World Wide Web) can be taken into account by the control device 30. In addition, historical temperature developments of the ambient temperature (for example in the last 24 hours) can be taken into account. The quantity of fuel in the pressure vessel 20 can also be detected and taken into account in the determination operation.

A final pressure value is determined by the control device 30 on the basis of this data, wherein the final pressure value is the pressure of the fuel in the pressure vessel 20 after a (prespecified or calculated) parking period of the vehicle. The final pressure value can be calculated by the control device 30. By way of example, the final pressure value can be calculated as follows:

pressure of the fuel in the pressure vessel when parking the vehicle is 26 bar at a temperature of the fuel in the pressure vessel of 55° C. (density approximately 1.89 g/l);

pressure of the fuel in the pressure vessel when restarting the vehicle is 20 bar at a temperature of the fuel in the pressure vessel of 20° C. (density approximately 1.89 g/l).

The (expected) parking period is calculated with reference to historical data. As an alternative or in addition, the driver can enter the length of the (expected) parking period into the control device 30.

The cooling down of the fuel in the pressure vessel 20 can be calculated by means of mathematical or physical models. Historical data from previous parking processes can also be employed here. The calculated or determined final pressure value indicates the magnitude of the pressure of the fuel in the pressure vessel 20 at the end of the parking period, that is to say when the vehicle is next started.

When the determined final pressure value corresponds to the minimum pressure value (for example 20 bar) or is greater than the minimum pressure value, restarting of the vehicle and extraction of fuel from the pressure vessel 20 is possible during or after restarting of the vehicle since there is no risk of damage to the pressure vessel 20 in the event of a further reduction in pressure due to the extraction of the fuel.

The control device 30 can make the decision as to whether the vehicle is capable of restarting after the parking period by way of comparing the final pressure value with the minimum pressure value.

If the control device 30 ascertains that the final pressure value lies below the minimum pressure value and/or it is ascertained that the closest filling station will no longer be reached, the control device 30 generates a notification signal. The notification signal can be used to display an item of information or a warning signal to the driver that restarting of the vehicle after the (planned or expected) parking period will not be possible. The display or the warning signal can acoustically and/or optically prompt the driver to fill the pressure vessel 20 with fuel before parking or turning off the vehicle (and the resulting cooling down of the fuel in the pressure vessel 20). The display or the warning signal can read, for example, "Do not park the vehicle! Fill the vehicle with fuel before parking!" An acoustic signal to the driver (warning sound) can also be generated on the basis of the notification signal here.

It is also conceivable, in response to the notification signal being generated, for the control device 30 to heat the fuel in the pressure vessel 20 using a heating apparatus, so that the pressure of the fuel corresponds at least to the minimum pressure value after the (planned) parking period. The final pressure value is repeatedly determined during heating. This heating is carried out by the control device 30 only when it is ascertained by the control device 30 that a pressure of this kind or a temperature of this kind of the fuel can be reached without exceeding a maximum temperature of the fuel in the pressure vessel 20 or a maximum temperature of the pressure vessel 20 and without exceeding a maximum pressure of the pressure vessel 20. If it is ascertained that this is not possible, the fuel in the pressure vessel 20 is not heated.

Since the vehicle and, respectively, the pressure vessel system 10 can (usually) be filled after restarting of the vehicle and further extraction of fuel from the pressure vessel 20 after parking the vehicle only when the vehicle has been moved to a filling station, the remaining range of the vehicle can be taken into account when determining the final pressure value. Therefore, the distance from the next filling station and the amount of fuel required to reach the filling station are calculated. The cooling down of the fuel in the pressure vessel 20 and the drop in pressure due to the extraction of fuel after parking are taken into account or included in the determination operation or calculation operation. When the fuel is extracted after parking on the way to the filling station, the pressure of the fuel must likewise not fall below the minimum pressure value. Therefore, a minimum pressure value is determined by the control device 30 and takes into account the extraction of fuel on the way from the parking location or the parking position of the vehicle to the filling station.

A notification signal is generated when the fuel or the pressure of the fuel after parking is (expected to be) insufficient to reach a filling station (without allowing the pressure of the fuel to fall below the minimum pressure value).

The minimum pressure value can be determined again at intervals or continuously during driving (and therefore before parking the vehicle). In this case, it is possible to start, for example, from a parking period which is of such a length that the temperature of the fuel has reached the temperature of the surrounding area (in particular the ambient temperature after the parking period) (thermodynamic equalization). As an alternative, the parking period can be estimated, for example, with reference to historical data. During driving of the vehicle, a warning can be issued to the driver on the basis of the notification signal or in response to the notification signal when he/she is so far away from the next filling station for filling the pressure vessel 20 with fuel, or shortly before this time, to do so that, when the temperature of the fuel is matched to the ambient temperature (either the current ambient temperature or the expected ambient temperature at a later time, wherein this is determined, for example, with reference to weather forecast data), the pressure of the fuel in the pressure vessel 20 lies below the minimum pressure value. This means that a check is made during driving as to whether the vehicle is capable of restarting, that is to say there is a sufficiently high pressure of the fuel after the parking period to move the vehicle, and the vehicle can be driven into the next filling station without falling below a minimum pressure in the pressure vessel 20 in the event of the vehicle being immediately parked and a parking period (which is so long that complete equalization of the fuel temperature and the ambient temperature has taken place or the duration of which is estimated on the basis of historical data). The driver can be warned by way of an acoustic and/or optical and/or haptic warning (for example "If you park the vehicle now, it is likely that you will no longer be able to reach a filling station after restarting the vehicle after parking!") if he/she is too far away from the filling station.

The consumption, the quantity of fuel in the pressure vessel 20 and/or the state (state of charge; SOC) of a high-voltage store can be taken into account when determining the remaining range.

The information about the location and/or the distance of the vehicle from the parking position to the filling station can be transmitted from a navigation system to the control device 30.

If the parking period is longer than planned or determined and/or the development of the ambient temperature differs from the weather forecast data, it may be the case that, under certain circumstances, the pressure of the fuel at the end of parking is nevertheless below the minimum pressure value. In this case, the fuel can be heated at the end of parking in order to raise the pressure of the fuel in the pressure vessel 20 to a value which corresponds at least to the minimum pressure value. This heating process is carried out only when the minimum pressure value can be reached without exceeding a maximum temperature of the fuel in the pressure vessel 20 and without exceeding a maximum pressure of the pressure vessel 20.

Characteristic maps can be used in order to determine the final pressure value. In this way, the final pressure value can be determined with a low level of computational expenditure. The characteristic maps can take into account, inter alia, the temperature of the fuel, the remaining range, the ambient temperature, the installation space temperature, the pressure of the fuel.

A buffer store for buffer-storing fuel can be arranged between the tank shut-off valve 70 and the fuel cell 60 (not shown), the buffer store supplying the fuel cell 60 with fuel when the tank shut-off valve 70 is closed (for example during parking). Therefore, the fuel cell 60 can be supplied with fuel at the end of the parking period or parking, so that the waste heat from the fuel cell heats the fuel in the pressure vessel 20 and/or the fuel cell supplies energy to a tank heat exchanger which is designed to heat the fuel in the pressure vessel 20. The tank heat exchanger can also be supplied with energy from a high-voltage store. Therefore, it is possible to heat the fuel in the pressure vessel 20 at the end of the parking period or parking in order to increase the pressure of the fuel in the pressure vessel 20 to or above the minimum pressure value if it is possible to reach the minimum pressure value without exceeding a maximum temperature of the fuel in the pressure vessel 20 and without exceeding a maximum pressure of the pressure vessel 20 solely by heating.

For the reasons of readability, the expression "at least one" has, in some instances, been omitted for the sake of simplicity. If a feature of the technology disclosed here is described in the singular or using the indefinite article (for example the/a pressure vessel, the/a control device etc.), the disclosure is simultaneously also intended to encompass the plural thereof (for example the at least one pressure vessel, the at least one control device etc.).

The above description of the present invention serves merely for illustrative purposes and not for the purposes of limiting the invention. In the context of the invention, numerous changes and modifications are possible without departing from the scope of the invention and its equivalents.

LIST OF REFERENCE CHARACTERS

10 Pressure vessel system
20 Pressure vessel
30 Control device
32, 33, 34, 35 Measuring lines
40 Ambient temperature measuring apparatus
45 First temperature measuring apparatus
50 Pressure measuring apparatus
55 Second temperature measuring apparatus
60 Fuel consuming apparatus
65 Fluid line
70 Tank shut-off valve The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for ascertaining a restarting capability of a vehicle, wherein the vehicle has a pressure vessel system comprising a pressure vessel for storing a fuel, and comprising the acts of:
   detecting a pressure and a temperature of the fuel in the pressure vessel;
   determining a final pressure value of the fuel in the pressure vessel, wherein the final pressure value is an expected pressure of the fuel in the pressure vessel after a parking period of the vehicle;
   comparing the determined final pressure value with a minimum pressure value for ascertaining whether the vehicle is capable of restarting after the parking period; and
   generating a notification signal when the determined final pressure value is lower than the minimum pressure value.

2. The method according to claim 1, wherein the method is performed during parking of the vehicle or before parking of the vehicle.

3. The method according to claim 1, wherein an ambient temperature is taken into account when determining the final pressure value.

4. The method according to claim 3, wherein an expected temperature development of the ambient temperature during the parking period is taken into account when determining the final pressure value.

5. The method according to claim 4, wherein the expected temperature development is based on weather forecast data.

6. The method according to claim 1 further comprising the act of providing a notification to a driver of the vehicle on a basis of the notification signal.

7. The method according to claim 6, wherein the notification to the driver is a warning notification to the driver of the vehicle that the vehicle should not be parked and that the pressure vessel of the vehicle should be filled before parking the vehicle.

8. The method according to claim 1, wherein, in response to the notification signal being generated, the fuel in the pressure vessel is heated and the final pressure value is determined again until the final pressure value has reached or undershot the minimum pressure value if it is possible to reach the minimum pressure value without exceeding a maximum temperature of the fuel in the pressure vessel and without exceeding a maximum pressure of the pressure vessel solely by heating.

9. The method according to claim 1, wherein the minimum pressure value is determined depending on a range of the vehicle which is required until a filling station for filling the pressure vessel is reached.

10. The method according to claim 1, wherein a temperature of the pressure vessel is taken into account when determining the final pressure value.

11. The method according to claim 1, wherein the act of determining the final pressure value of the fuel in the pressure vessel is carried out on a basis of a characteristic map.

12. The method according to claim 1 further comprising the act of heating the fuel in the pressure vessel when the pressure of the fuel in the pressure vessel lies below the minimum pressure value when restarting the vehicle after parking.

13. A pressure vessel system for a vehicle, comprising:
a pressure vessel, wherein a fuel is stored in the pressure vessel;
a first temperature measuring apparatus, wherein a temperature of the fuel in the pressure vessel is measurable by the first temperature measuring apparatus;
a pressure measuring apparatus, wherein a pressure of the fuel in the pressure vessel is measurable by the pressure measuring apparatus; and
a control device, wherein the control device is configured to:
determine a final pressure value of the fuel in the pressure vessel, wherein the final pressure value is an expected pressure of the fuel in the pressure vessel after a parking period of the vehicle;
compare the determined final pressure value with a minimum pressure value for ascertaining whether the vehicle is capable of restarting after the parking period; and
generate a notification signal when the determined final pressure value is lower than the minimum pressure value.

14. The pressure vessel system according to claim 13, wherein the control device is configured to determine, compare, and generate when the vehicle is being parked.

15. The pressure vessel system according to claim 13, further comprising:
a heating apparatus, wherein the fuel in the pressure vessel is heatable by the heating apparatus in response to the notification signal if it is possible to reach the minimum pressure value without exceeding a maximum temperature of the fuel in the pressure vessel and without exceeding a maximum pressure of the pressure vessel solely by heating;
wherein the control device is configured to determine the final pressure value again until the final pressure value has reached or exceeded the minimum pressure value.

16. The pressure vessel system according to claim 15, wherein the heating apparatus is a heat exchanger.

17. The pressure vessel system according to claim 13 further comprising:
a fuel consuming apparatus, wherein the vehicle is drivable by the fuel consuming apparatus and wherein the fuel consuming apparatus is supplyable with fuel from the pressure vessel via a fluid line; and
a buffer store, wherein fuel from the pressure vessel is storable by the buffer store and wherein fuel is supplyable to the fuel consuming apparatus by the buffer store when the fluid line is blocked.

* * * * *